(No Model.) 2 Sheets—Sheet 1.

J. H. MILLER, Jr.
GAS GENERATOR.

No. 534,070. Patented Feb. 12, 1895.

WITNESSES: Darwin S. Wolcott, C. E. Hunt.

INVENTOR, John H. Miller Jr. by George H. Christy, Att'y.

(No Model.) 2 Sheets—Sheet 2.

J. H. MILLER, Jr.
GAS GENERATOR.

No. 534,070. Patented Feb. 12, 1895.

WITNESSES:
Darwin S. Wolcott
C. E. Hunt.

INVENTOR,
John H. Miller Jr.,
by George H. Christy
Att'y.

UNITED STATES PATENT OFFICE.

JOHN H. MILLER, JR., OF PITTSBURG, PENNSYLVANIA, ASSIGNOR OF SEVENTY-FIVE ONE-HUNDREDTHS TO WILLIAM J. McCLURG AND COMMODORE R. MILLER, OF SAME PLACE.

GAS-GENERATOR.

SPECIFICATION forming part of Letters Patent No. 534,070, dated February 12, 1895.

Application filed February 24, 1894. Serial No. 501,370. (No model.)

*To all whom it may concern:*

Be it known that I, JOHN H. MILLER, Jr., a citizen of the United States, residing at Pittsburg, in the county of Allegheny and State of Pennsylvania, have invented or discovered certain new and useful Improvements in Gas-Producers, of which improvements the following is a specification.

In Letters Patent No. 494,012, granted March 21, 1893, for improvements in gas generators, I have described and claimed certain improvements in the construction of such generators, whereby a fixed gas may be obtained through the preliminary decomposition of steam and oil, and the subsequent re-combination and fixing of the gases by traverse along the heated surfaces of tiles arranged in a zigzag order. This generator is constructed with two compartments, each provided with zigzag baffle plates or tiles, and in the operation of the generator, oil is forced into the upper end of one of the compartments, and, passing down over the baffle plates in such compartment, is decomposed, and the gas so generated passes thence into the other compartment, where they combine with the decomposed steam and products of combustion, and the combined gases passing over the inclined baffle plates in such second compartment, are subjected to sufficient heat to form a fixed gas. In the operation of this generator, I have ascertained that the oil will percolate through the partition wall separating the two compartments, and enter the other compartment without being sufficiently decomposed, and will not, therefore, properly combine to form a good fixed gas, with the constitutents of the steam and products of combustion.

The object of the present invention is to prevent the percolation of the oil or its gases, from one chamber to the other; and it is a further object of my invention to provide certain improved means whereby the baffle plates may be separated one from the other, and their removal from the compartments rendered easy.

In general terms, the invention consists in the construction and combination substantially as hereinafter described and claimed.

Figure 1:
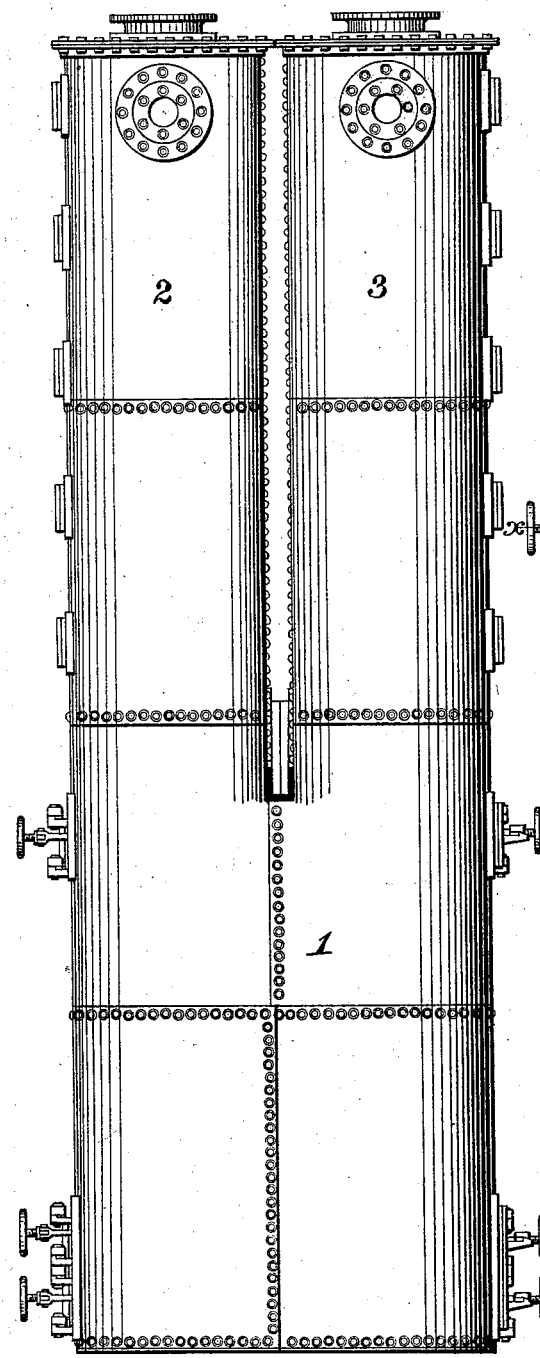
Figure 2:
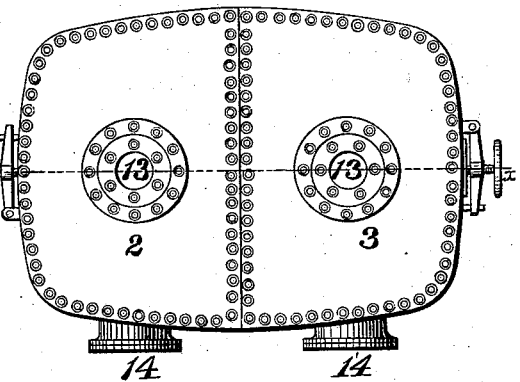
Figure 3:
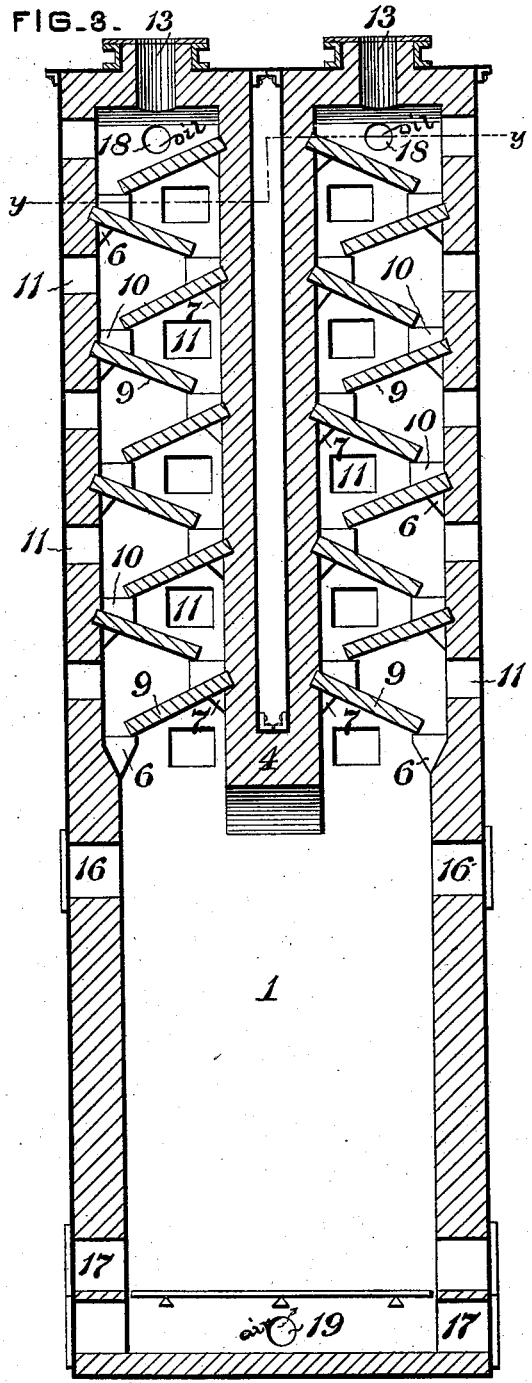
Figure 4:
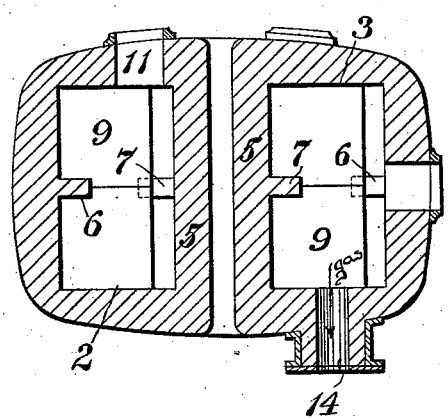

In the accompanying drawings, forming a part of this specification, Figure 1 is a view, in side elevation, of my improved generator. Fig. 2 is a top plan view of the same. Fig. 3 is a sectional elevation, the plane of section being indicated by the line $x, x$, Fig. 2, and Fig. 4 is a sectional plan, the plane of section being indicated by the line $y, y$, Fig. 3.

In the practice of my invention the generator is constructed as regards the fuel chamber 1, compartments 2 and 3, and the arch 4, supporting the inner or adjacent walls of the compartments. The outside walls of the compartments 2 and 3 and the opposite walls or sides 5, are provided with a series of corbels 6 and 7, the corbels on the outside walls alternating with those on the inside walls, so that the tiles 9, in each compartment, will have considerable inclination. In lieu of supporting one of the edges of the titles or baffle plates by the tile next below, which requires a recessing of one edge of the tile or plate, as described in said Letters Patent, blocks 10 are arranged on the upper side of each tile or plate near its edge for supporting the lower edge of the tile or plate next above. This construction provides ample space for the flow of oil between the edges of the tiles and the walls of the chambers, and also ample space for the passage of gases up through the compartments. As these blocks 10 rest loosely upon the tiles, they will not interfere with the removal of the latter and the insertion of new ones.

In the operation of the generator, the upper surfaces of the tiles become clogged with soot and residuum from the oil, and prevent a free flow of the latter down over the plates. In order to overcome this difficulty, a series of hand holes 11 are formed through the side walls of the generators, through which suitable tools may be inserted for cleaning the surfaces of the tiles.

In order to prevent the percolation of the oil from one chamber to the other, the chambers are formed in independent structures except at their lower ends where they unite with the lower portion of the generator. The walls 5 of the chambers are covered exteriorly with sheet metal to prevent the escape of the oil into the opening between them.

The generator is provided with draft outlets 13, having suitable covers, with mains 14, provided with suitable valves, for conducting away the gas, and with suitable charging openings 16, and openings 17 for the removal of clinker and ashes, said openings being provided with suitable doors. Pipes 18 enter each of the compartments above the baffle plates for the introduction of oil, and steam is introduced below the grate by the pipe 19.

In starting the generator, both of the draft outlets 13 open until the fuel has become incandescent and the baffle-plates 9 properly heated. The draft outlets are then closed, and the valve in the main 14 of one of the fixing chambers, as 3, is opened so that gases generated in the fuel chamber will flow up through the fixing chamber 3 and out through its main 14. At the same time, oil is admitted into the chamber 2 so that it will flow down over the baffle-plates 9 therein. As it flows over the hot plates, the oil is completely vaporized, and the vapor is drawn down from the chamber 2 to the upper end of the fuel chamber where it commingles with the gases generated in the fuel chamber and passes therewith through the chamber 3. As soon as the plates in the chamber 2 become cooled, the operation of the generator is reversed; that is, the gases from the fuel chamber are caused to pass up through the fixing chamber 2, while oil is admitted into the upper end of the chamber 3.

I claim herein as my invention—

1. A gas generator having in combination a fuel chamber, two fixing chambers arranged above the fuel chamber and connecting therewith, and with each other at points above the normal fuel level the inner or adjacent walls of the fixing chambers being independent of each other, baffle plates arranged in said chambers, pipes for introducing oil into the upper portions of said chambers, and pipes for conducting the gases away from the chambers, substantially as set forth.

2. A gas generator having in combination a fuel chamber, two fixing chambers arranged above the fuel chamber and connecting therewith, and with each other at points above the normal fuel level the inner or adjacent walls of the fixing chambers being independent of each other and having their exterior faces covered with sheet metal, baffle plates arranged in said chambers, pipes for introducing oil into the upper portion of said chambers, and pipes for conducting the gases away, substantially as set forth.

3. A gas generator provided with a chamber having corbels or projections formed on its side walls, in combination with baffle plates having one edge supported by said corbels, and blocks resting upon the upper or supported portion of one plate and supporting the lower edge of the plate next above, substantially as set forth.

In testimony whereof I have hereunto set my hand.

JOHN H. MILLER JR.

Witnesses:
MILETUS GARNER,
L. J. WALKER.